July 28, 1959     J. C. HORST     2,896,331
DEVICE FOR MEASURING THE DIAMETER OF A RAILWAY
CAR AXLE IN AN AXLE BOX
Filed May 13, 1955     2 Sheets-Sheet 1
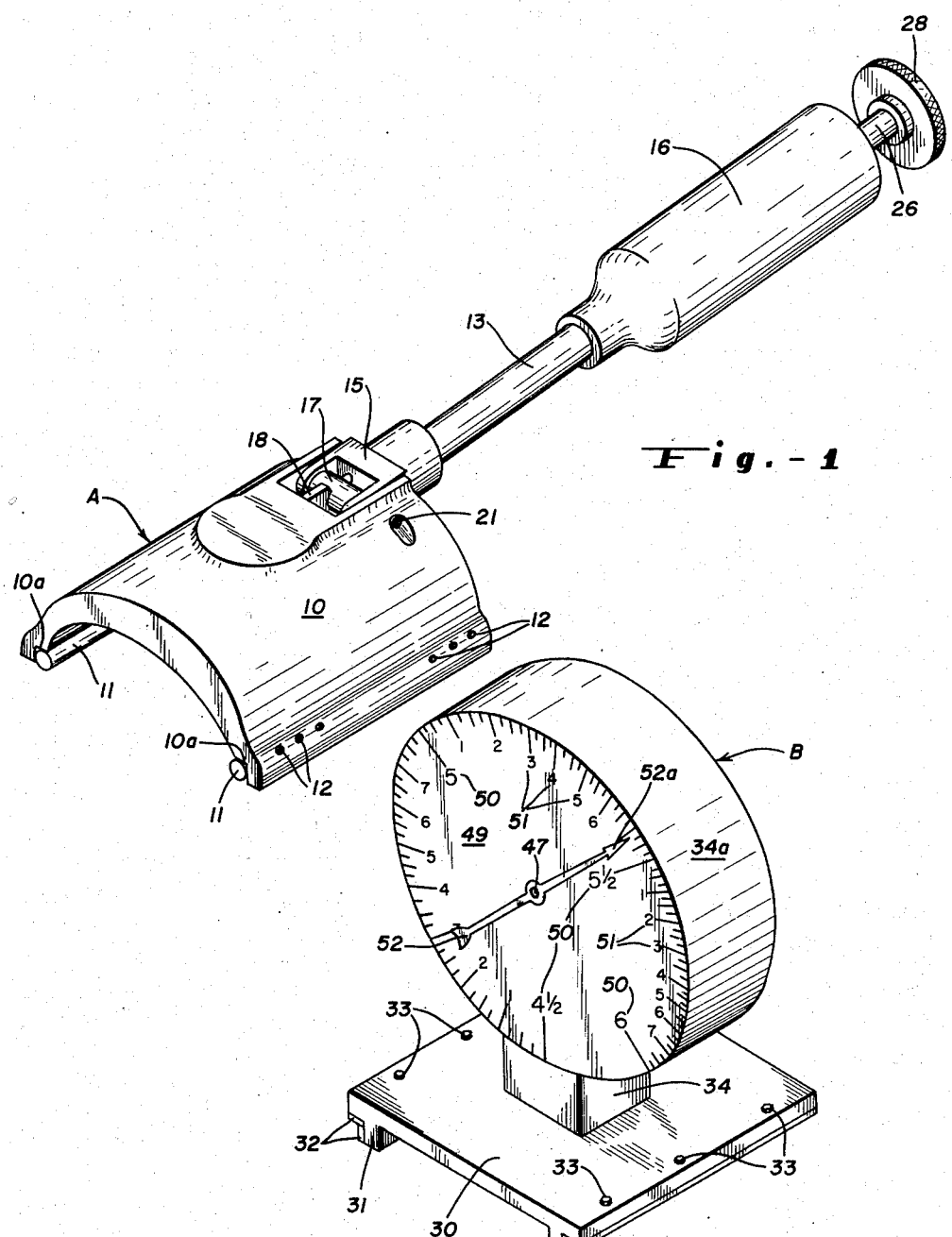
INVENTOR.
John C. Horst
BY
ATTORNEYS July 28, 1959

J. C. HORST 2,896,331

DEVICE FOR MEASURING THE DIAMETER OF A RAILWAY
CAR AXLE IN AN AXLE BOX

Filed May 13, 1955

INVENTOR.
John C. Horst
BY

McGrew & Edwards
ATTORNEYS

United States Patent Office 2,896,331
Patented July 28, 1959

2,896,331

DEVICE FOR MEASURING THE DIAMETER OF A RAILWAY CAR AXLE IN AN AXLE BOX

John C. Horst, Adams County, Colo.

Application May 13, 1955, Serial No. 508,238

10 Claims. (Cl. 33—178)

My present invention relates to a device or instrument for measuring the diameter of a round or cylindrical body, such as a railway car axle. My instrument has many uses but one of its principal uses is in the accurate and rapid measuring of the diameter of a railway car axle after the removal of the worn axle bearing block or brass to permit the replacement of the worn brass with a new brass, or with a brass which has been machine-contoured, with a machine such as that disclosed by the copending application of Peter C. Thomas and John C. Horst, Serial No. 419,974. The instrument of the present invention may take several forms, but a preferred form is the one illustrated in the accompanying drawings.

As is well known to railroad men, it has been impossible, or virtually impossible, with known and available instruments or devices, to take an accurate and dependable diameter measurement of a railway car axle in the axle box, this for the reason that such instruments could not be properly engaged with the axle within the axle box to take its diameter and maintain an accurate measurement thereof while removing it to a point outside the box for checking said measurement. Without such accurate measurement available as a guide, it has been practically impossible to properly dress down or contour a brass or axle bearing block to even approximately the actual diameter of the axle which was measured.

It is, therefore, one of the objects of my present invention to provide a new and novel instrument or device as referred to above with which it is possible for an unskilled workman, as well as a skilled mechanic, to take accurate diameter measurements of railway car axles within their axle boxes, with each accurate measurement being indicated or registered visibly by the device.

With my new instrument or device, there is no guess-work nor trial and error procedure involved. The measuring element or unit of the instrument or device is simply placed upon the car axle, tightening means on the handle is adjusted to hold the setting or measurement made by the element of the device, and then said element is removed from the axle and brought into contact with another element of the instrument or device which constitutes the indicating means which visibly registers the exact outside diameter of the axle measured.

Another object of my invention is to provide an intrument or device as aforesaid which is so shaped and proportioned as to enable a workman, while in a comfortable standing position, to place it in an axle box so as to embrace the axle and take its accurate outside diameter measurement, which measurement is then visibly registered or indicated by the application to the first element of the instrument of the registering or diameter-indicating element thereof.

A further object of my invention is to provide an extremely sensitive device as aforesaid, capable of minute and accurate diameter or thickness measurements of various bodies, such as railway car axles, with speed, ease and facility.

The foregoing and other objects and advantages of my present invention will appear from the following description and appended claims when considered in conjunction with the accompanying drawings forming a part of this specification wherein like reference characters designate corresponding parts in the several views.

In said drawings:

Fig. 1 is a perspective view of the measurement-taking or determining unit or portion of my instrument or device for measuring and registering, or indicating the exact diameter of various bodies, such as railway car axles;

Fig. 2 is a perspective view of the measurement registering or indicating unit or element of my improved instrument or device;

Figure 3:
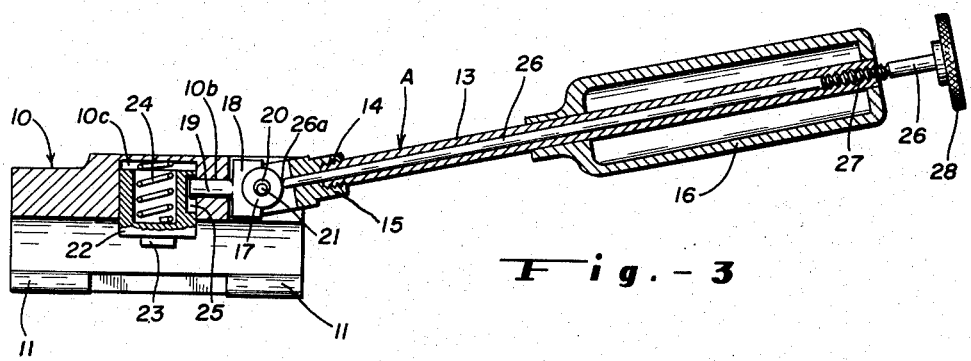
Fig. 3 is a longitudinal sectional view taken through the device shown in Fig. 1.
Figure 4:
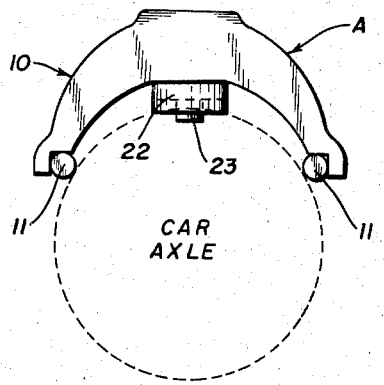
Figure 5:
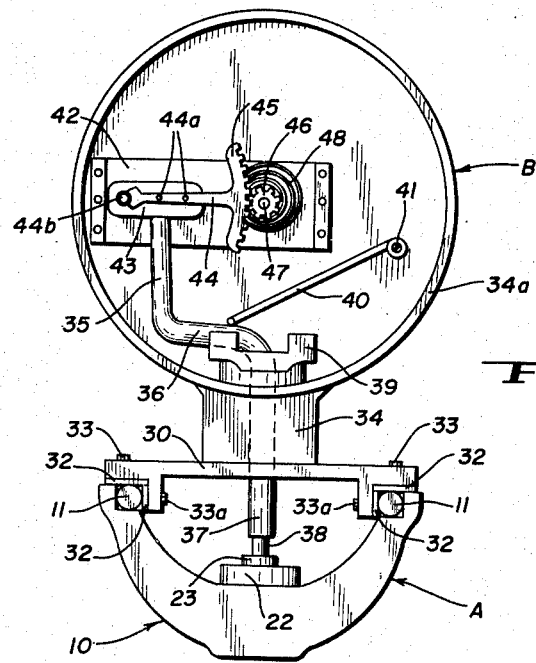

Fig. 4 is a front end elevational view of the axle measuring device or element seen in Figs. 1 and 3, showing in broken lines a railway car axle being measured; and Fig. 5 is a rear end elevational view of the assembled portions or units of the instrument or device of the present invention, showing them in cooperative relationship for registering or indicating the exact diameter of the body having been measured, with the rear cover plate for the casing of the indicating device being removed to expose the inner working parts.

Before explaining in detail the present invention, it is to be understood that the invention is not limited in its application to the details of construction and arrangement of parts illustrated in the accompanying drawing, since the invention is capable of other embodiments and of being practiced or carried out in various ways. It is to be understood also that the phraseology or terminology employed herein is for the purpose of description and not of limitation, and it is not intended to limit the invention claimed herein beyond the requirements of the prior art.

Briefly, my present invention embodies a measuring instrument or device for measuring the diameter of round bodies, such as railway car axles, and in its present embodiment is in the form of two units or elements which are employed to take the measurement and to then visibly indicate the exact measurement of the axle diameter. The actual measuring instrument unit is inserted into the axle box and its arcuate or arched head portion placed upon the axle. It is held in this position by the handle portion of the unit which has adjustment means at the operator end of the handle portion, permitting the operator to make the measuring adjustment and then set the unit with that measuring adjustment fixed. Thereafter, by means of the handle, he removes the axle measuring unit from the axle box and brings it into intimate contact with the base portion of the graduated measurement registering or indicating unit or elemen of the device. This lattter unit, by indicating to the workman the exact measurement of the axle diameter, enables him to install the proper size replacement brass on the axle. If the exact size brass is not readily available and it is desired to contour and regroove a used brass as a replacement, the indicating device informs the operator of the machine exactly how much the used brass should be contoured or dressed down before it is installed in the axle box. The two units or elements of the present instrument are shown in their cooperative relationship in Fig. 5 of the drawings.

Referring now to the drawings, the separated units of the instrument are shown in Figs. 1 through 4 and the combined units in Fig. 5, wherein A represents the measuring unit and is shown separately in Figs. 1, 3 and 4 and in its combined relationship with the indicating or registering unit B, in Fig. 5. This measurement indicating or registering unit B is shown separately in Fig. 2.

I shall now describe the diameter measuring unit of my instrument, namely that portion of the device which is indicated as a whole by the letter "A". This element or unit of the device comprises a head portion 10 which, as shown, is of arcuate shape, or arched, as clearly seen in Figs. 1 and 3. The undersurface of head 10 at its opposite sides is provided with grooves 10a in which are mounted and secured high-speed steel rod sections or lengths 11 which are held in place in the head 10 by screws or the like 12. Since it is desirable to provide a unit having great strength yet one which is of relatively light weight, I have formed the head portion 10 from an aluminum casting. Thus, to prevent wear on the casting from long usage, I have provided the insert rod sections 11 which, in using the device, come directly into contact with the steel axle, as clearly seen in Fig. 4.

Projecting outwardly from the head portion 10 is a tubular shank 13, threaded at 14, into the threaded socket of a yoke member 15. The outer end portion of the tubular shank 13 carries a handle 16 which is mounted thereon in any suitable manner, as by swaging. Yoke member 15 embraces a roller-like member 17 which in turn engages in a notch formed in an upright pressure-applying member or the like 18 which has a forwardly projecting pin or extension 19 which projects into and through a hole or opening formed in head 10, see particularly Fig. 3. The roller-like member 17, which functions similar to a cam in use, is provided with an oversize center opening 20 and the member is held in position with relation to the yoke 15 and cavity in head 10 by a pin 21, see Figs. 1 and 3.

The head member 10 has a closed-top cavity or socket 10c formed therein to receive and support a plunger 22 having a depending lower projection 23. Projection 23 is of considerably smaller diameter than plunger 22. Plunger 22 is hollow and contains a coil spring 24 which tends to force the plunger downwardly away from the upper end of socket 10c. The outer upright wall of plunger 22 is provided with a vertical slot or recess 25 into which the pin 19 extends. With reference particularly to Fig. 3, it will be understood that the pin 19 limits the downward movement of plunger 22 under the action of spring 24. It also serves to maintain the parts in their assembled relationship.

The entire unit A may be transported and manipulated by grasping handle 16. An adjustment rod 26 having a threaded portion 27 and a knurled finger grip portion 28 at its outer end, extends through the tubular shank 13 and the inner end 26a thereof engages the surface of the roller-like member or cam-like member 17. It will be understood, therefore, that by rotating the finger piece 28 in a clockwise direction, the rod will be caused to push against the cam 17 and force the projecting pin 19 of member 18 into intimate and binding contact with the back wall of plunger slot 25 to hold the plunger in its then axle-measuring position. This action is, of course, permitted by virtue of the floating connection between members 17 and 21 wherein the cam or roller 17 has the oversize center opening 20, mentioned above.

In use, the measuring portion or unit A of my device is lifted by grasping handle 16 and is placed upon the exposed axle portion located within an axle box (not shown) until the four steel rod lengths or contact members 11 rest upon and in intimate contact with the axle, with the head portion of the unit embracing said axle, see Fig. 4. When in this position, the spring 24 tends to force the plunger toward the axle and bring the lead end or portion 23 thereof into intimate contact with the surface of the axle. When this has taken place, the operator rotates finger piece 28 in a clockwise direction to cause rod 26, 26a to force roller 17, member 18, and the locking pin 19 into firm or intimate and binding engagement with the vertical slot 25 of plunger 22, thus releasably locking the parts in that position. The unit A is now removed from within the axle box and is brought into contact with the base of the registering or indicating unit or portion B of the device.

Portion or unit B, namely the registering or indicating unit of my instrument or device, is shown in Figs. 2 and 5 of the drawings. Fig. 2 is a face perspective view showing the graduated dial and indicating finger, or hand, and Fig. 5 is a rear elevational view in which the device is assembled with the measuring unit or element A, and with the back plate of the casing removed so that the working parts of the indicator are exposed to view.

As shown, the indicator B has a substantially square base 30 formed as a casting of aluminum or other similar light metal or metal alloy. The base has two spaced depending ribs or projections 31 which extend in parallelism across one dimension of the base adjacent two opposite edges thereof. Insert wear-resisting strips 32 are applied to the underside of the base 30 and to the outer faces of the ribs 31 and are held thereto, respectively, by cap screws, or the like, 33 and 33a. These strips 32 are preferably formed from high speed steel and serve as the wear strips for the unit when they are brought into contact with the steel rod sections or lengths 11 of unit A, as when the units A and B are in assembled relationship, as shown in Fig. 5.

The base 30 is provided with a pedestal 34 having a vertical opening therein and above the pedestal is mounted a round casing or housing 34a which contains the mechanism for operating the indicating finger 52 shown in Fig. 2. Indicating finger 52, having a pointer or tip 52a, is fixedly mounted upon a pin or axle 47 to move with it. The indicating finger 52, 52a is operated by means which makes contact with the spring-pressed plunger 22, 23, of the measuring unit A when the units A and B are in the assembled relationship of Fig. 5. Such means, as shown, comprises a rod having an upper portion 35, a substantially horizontal portion 36 and a depending portion 37 which latter portion extends downwardly through the opening or space in the pedestal 34 and an aligned opening formed in the base 30. The lower end portion 37 of the rod or plunger carries a projecting pin or member 38 which actually makes contact with the projection 23 on the spring-pressed plunger 22 of the head portion 10 of unit A. The horizontal portion 36 of the rod rests in a supporting bracket or cradle 39 and the rod or plunger 35, 36, 37, is normally held in its downward or projected position by a pressure-applying arm 40 mounted in the casing by a pin, or the like 41.

The front wall of the casing 34a carries a supporting plate or bracket 42 and the upper end of arm 35 is attached to a rectangular plate 43, which in turn is attached to the arm 44 of a rack or toothed segment 45, by means of screws, rivets, or the like 44a. The end of arm 44, at the left in Fig. 5, is mounted upon a pivot pin 44b which extends through the reinforcing plate 43 and is mounted in plate 42 carried by the front wall or face of the indicator casing. A gear 46 is mounted upon pin or shaft 47 which carries at its outer end, see Fig. 2, the indicating finger 52 having the arrow head or tip 52a.

A clock-type spring 48 has one end secured to plate 42 and the opposite end is associated with the gear 46, the tendency of the spring being to maintain the gear and the intermeshed rack in the positions in which they are shown in Fig. 5. After a measurement has been registered, or indicated, and the rack moved out of the position in which it is shown in the drawings, the spring 48 tends to return the parts to their normal positions immediately the units A and B are separated or moved apart.

Referring now particularly to Fig. 2 of the drawings, the face or dial of the indicating unit B is provided with graduations 50 which will register or indicate the precise diameter of an object of round, or generally round, cross-section from 4½ inches to 6 inches. These measurements of the graduating dial are indicated by large numerals and the finer measurements between the "inch" marks of the dial are indicated at 51 and designated by smaller numerals.

Thus, after a measurement has been taken by unit A as described above, units A and B are brought together in intimate relationship, as shown in Fig. 5 of the drawing. Assuming the axle or other object diameter measurement taken was approximately 5 and 7/16ths inches, the pointer 52a of the indicating finger 52 will assume the position in which it is shown in Fig. 2. This, therefore, indicates the precise outside axle diameter and informs the operator as to exactly the size brass required as a replacement for the worn brass removed from the measured axle and axle box. Moreover, if brass of the required size and contoured surface is not ready or available, unit B then serves to indicate to the operator the exact setting required for the mechanism of the brass-contouring or dressing machine to properly shape or contour a worn brass to the required size for use as the replacement brass. As stated at the outset of this description, such a shaping or contouring machine is covered by the copending joint application of Peter C. Thomas and John C. Horst, Serial No. 419,974.

It is to be understood that the clockwork-like mechanism shown in Fig. 5 of the drawings and located within the casing 34a can be changed or varied at will. The mechanism shown is merely illustrative of one group or choice of parts, or members, which may be assembled to effect the desired result achieved by unit B of my instrument.

By virtue of my invention, even an unskilled workman can take an accurate measurement of a car axle and then produce a visible reading or indication of that exact measurement so that he, or another workman, may replaced the worn brass which was removed from the axle and axle box, with the proper size and contoured new or reconditioned brass. This axle measurement indicating operation is achieved by the simple expedient of placing or the bringing together of the two units of my instrument, namely, measuring unit A and registering unit B, until they assume the cooperative relationship in which they are seen in Fig. 5. This placing or bringing together of the units A and B may be done while the operator is holding the parts in his hands, the illustration of Fig. 5, with the unit A shown in inverted position, being merely illustrative of one way of positioning the units for obtaining the axle measurement reading.

I claim:

1. An instrument for accurately measuring the outside diameter of an object of round cross section, such as that portion of a railway car axle disposed within an axle box, comprising an arcuate member adapted to contact the axle at spaced lines, a spring-urged plunger carried by said member and engageable with said axle within the area defined by the spaced lines of contact, a handle extending outwardly from one end of the arcuate member, means movable into engagement with said plunger to maintain the plunger in axle-contacting position, and means associated with the handle for releasably holding said first-named means in such engagement after the removal of the instrument from contact with the axle.

2. An instrument for accurately measuring and indicating the outside diameter of an object of round cross section, such as that portion of a railway car axle disposed within an axle box, comprising an arcuate member adapted to contact the axle at spaced lines, a spring-urged plunger carried by said member and engageable with said axle within the area defined by the spaced lines of contact, a handle extending outwardly from said arcuate member, means movable into engagement with said plunger to maintain the plunger in axle-contacting position, adjustable means associated with the handle for releasably holding said first-named means in such engagement after the removal of the instrument from contact with the axle, and visible measurement-indicating means cooperable with said arcuate member to register the exact outside diameter of said axle.

3. Means for accurately measuring and indicating the outside diameter of an object of round cross-section, such as a railway car axle, comprising a curved head member of generally rectangular form having metal rods at the four corners thereof for line contact engagement with the axle at those four points, a spring-urged plunger carried by the head member at approximately the center thereof, said plunger having a centrally disposed lead projection on its outer surface of considerably smaller diameter than the diameter of the plunger for engagement with the axle, a tiltable handle extending outwardly from one side of the head member, means movable into engagement with said plunger to maintain the plunger in axle-contacting relationship, adjustable means associated with the handle for releasably holding said first-named means in such engagement after the removal of the instrument from contact with the axle, and a visible measurement-indicating means having a base portion cooperable with the removed head member to register the exact outside diameter of the measured axle, said indicating means including a spring-controlled plunger engageable by the spring-urged plunger, a graduated dial having measurement indicating numerals thereon, and an indicating finger movable over said graduated dial and operated by the engagement of the spring-urged plunger and the spring-controlled plunger when they are in contact with each other to indicate the precise outside diameter of the axle as determined by said head member.

4. Means according to claim 3, wherein the head member is formed principally as an aluminum casting whose corner rods are formed from steel and are secured thereto, and wherein the base portion of the visible measurement-indicating means is also formed as an aluminum casting and has steel reinforcing strips secured to the underside thereof for engagement with the corner rods of the head member.

5. An instrument for measuring the diameter of round objects, such as the portion of a railway car axle disposed within an axle box, comprising a member having an inner surface providing spaced lines of contact on an axle on which it is seated, a plunger carried by said member and arranged to engage said axle within the area defined by said spaced lines of contact, a handle member connected to and extending from said axle-contacting member, and means operable from the outer extremity of said handle member for engaging the plunger in its axle-contacting position so as to hold it in such position while the instrument is moved out of the axle box by manipulation of said handle.

6. An instrument as defined in claim 5, in which the inner surface of the axle-contacting member is curved.

7. An instrument as defined in claim 5, in which the handle member is mounted in pivotal connection with the axle-contacting member.

8. An instrument for measuring the diameter of round objects, such as the portion of a railway car axle disposed within an axle box, comprising a member having an inner surface providing spaced lines of contact on an axle on which it is seated, a plunger carried by said member and arranged to engage said axle within the area defined by said spaced lines of contact, a handle member connected to and extending from said axle-contacting member, means operable from the outer extremity of said handle member for engaging the plunger in its axle-contacting position so as to hold it in such position, and a measurement indicating unit having means for engaging said plunger in the held position so as to indicate the diameter of the axle.

9. An instrument as defined in claim 8, in which the measurement indicating unit has spring urged means for engaging said plunger.

10. An instrument for measuring the exterior surface of a railway car axle disposed in an axle box, comprising means mounted for placement on an axle in an axle box having two lines of contact for straddling engagement with the axle and a spring pressed plunger disposed between said lines to measure the outside diameter of said axle, means for holding said plunger at a selected measuring position, and means cooperating with said plunger in said held position after removal from said axle for visual indication of said held position of measurement.

References Cited in the file of this patent

UNITED STATES PATENTS

| | | |
|---|---|---|
| 1,485,154 | Aldeborgh | Feb. 26, 1924 |
| 1,617,284 | Ames | Feb. 8, 1927 |
| 1,619,771 | Tingley | Mar. 1, 1927 |
| 1,789,020 | Parker | Jan. 13, 1931 |
| 1,861,172 | Aldeborgh | May 31, 1932 |
| 2,408,672 | Mennesson | Oct. 1, 1946 |
| 2,503,871 | Hartl | Apr. 11, 1950 |
| 2,548,010 | Frisz | Apr. 10, 1951 |
| 2,599,835 | Johnson | June 10, 1952 |
| 2,620,653 | Mennesson | Dec. 9, 1952 |

FOREIGN PATENTS

| | | |
|---|---|---|
| 142,789 | Sweden | Nov. 3, 1953 |